United States Patent
Maji et al.

(10) Patent No.: US 8,630,358 B2
(45) Date of Patent: Jan. 14, 2014

(54) DATA PACKET FLOW CONTROL ACROSS AN ASYNCHRONOUS CLOCK DOMAIN BOUNDARY

(75) Inventors: Partha Prasun Maji, Sheffield (GB); Steven Richard Mellor, Sheffield (GB)

(73) Assignee: ARM Limited, Cambridge (GB)

( * ) Notice: Subject to any disclaimer, the term of this patent is extended or adjusted under 35 U.S.C. 154(b) by 116 days.

(21) Appl. No.: 13/424,778

(22) Filed: Mar. 20, 2012

(65) Prior Publication Data

US 2013/0251006 A1  Sep. 26, 2013

(51) Int. Cl.
*H04L 27/00* (2006.01)

(52) U.S. Cl.
USPC ............................................. 375/259; 327/1

(58) Field of Classification Search
USPC ....................................................... 375/259
See application file for complete search history.

(56) References Cited

U.S. PATENT DOCUMENTS

| 7,010,607 B1 * | 3/2006 | Bunton ......................... 709/228 |
| 7,783,820 B2 * | 8/2010 | Shelton et al. ................ 710/314 |
| 2004/0003332 A1 * | 1/2004 | Kim et al. ..................... 714/744 |
| 2005/0238038 A1 * | 10/2005 | Keller et al. .................. 370/429 |
| 2010/0111117 A1 * | 5/2010 | Kolinummi et al. .......... 370/503 |

OTHER PUBLICATIONS

Dielissen et al., "Concepts and Implementation of the Philips Network-on-Chip", *Philips Research Laboratories*, No Date, pp. 1-6.
Daly et al., "Virtual-Channel Flow Control", *IEEE Transactions on Parallel and Distributed Systems*, vol. 3, No. 2, Mar. 1992, pp. 194-205.
Xu et al., "Nisar: An AXI Complaint On-chip NI Architecture Offering Transaction Reordering Processing", *IEEE*, Jul. 2007, pp. 890-893.

\* cited by examiner

*Primary Examiner* — Erin File
(74) *Attorney, Agent, or Firm* — Nixon & Vanderhye P.C.

(57) ABSTRACT

A system-on-chip integrated circuit 2 includes a packet transmitter 28 for generating data packets to be sent via a communication circuit 34 to a packet receiver 30 containing a buffer circuit 32. A transmitter counter 36 stores a transmitter count value counting data packets sent. A receiver counter 38 stores a receiver count value tracking data packets emptied from the buffer circuit 32. A comparison circuitry 40 is used to compare the transmitter count value and the receiver count value to determine whether or not there is storage space available within the buffer circuit 30 to receive transmission of further data packets. The packet transmitter 28 operates in a transmitter clock domain that is asynchronous from a receiver clock domain in which the packet receiver operates. One of the count values is passed across this asynchronous clock boundary in order that the comparison may be performed and flow control exercised.

20 Claims, 7 Drawing Sheets

DATA PACKET FLOW CONTROL ACROSS AN ASYNCHRONOUS CLOCK DOMAIN BOUNDARY

BACKGROUND OF THE INVENTION

1. Field of the Invention

This invention relates to the field of data processing systems. More particularly, this invention relates to data processing systems in which data packets are transferred between a packet transmitter and a packet receiver. It is known to provide data processing systems in which data packets are transmitted between a packet transmitter and a packet receiver. Example forms of such systems may be employed for the transmission of data within system-on-chip integrated circuits.

2. Description of the Prior Art

It is known to design system-on-chip integrated circuits by connecting together a plurality of functional circuit blocks using interconnect circuitry. As an example, the functional circuit blocks may include a processor core, a graphics processing unit, a memory controller, input/output interface circuitry etc. The interconnect circuitry may have the form of a wide parallel signal connection in which a plurality of multi-bit channels are provided passing in each direction. An example of such an interconnect architecture is the AXI interconnect architecture designed by ARM Limited of Cambridge, England. A problem with this approach as system-on-chip integrated circuits increase in complexity and size is that the parallel interconnect circuitry may include a disadvantageously large number of signal lines which can require routing over long distances within the system-on-chip integrated circuit thereby consuming a disadvantageous amount of circuit area and resource.

In order to address the above problem of routing wide parallel interconnect circuitry over relatively large distances within a system-on-chip integrated circuit, it has been proposed to convert the parallel signals at the source into a plurality of data packets which can then be serially transmitted over a narrower interconnect. As an example, a full parallel interface of over 100 signal lines may be broken down into a plurality of narrower multi-bit data packets which are each transferred in turn in a time-division-multiplexed fashion over a narrower interconnect before being reassembled at the packet receiver into the full width parallel interface signals and applied to the destination circuitry.

It is known within some systems that the data source and the data destination may be operating in different clock domains. For example, a system-on-chip integrated circuit may include multiple clock domains using clocks of different frequencies. Some of the frequencies may vary depending upon the performance requirements of the circuitry within that domain at a particular point in time e.g. a processor core may have its clock frequency varied depending upon the processing workload it currently faces with a lower clock frequency being used when the workload is low in order to reduce power consumption. An additional complication is that the clocks used to control the circuitry within different clock domains may be asynchronous from one another. This imposes a difficulty in passing data packets and associated control signals between the different clock domains with their asynchronous clock signals.

One way of dealing with passing signals between asynchronous clock domains is to provide first-in-first-out buffers between the clock domains into which signals can be captured for resynchronising with the clock signal of the destination clock domain. A problem with this approach is the circuit area and resource consumed by the need to provide such first-in-first-out buffers for all of the signals crossing the asynchronous clock boundary. As well as the data packets themselves which pass between the packet transmitter and the packet receiver across the asynchronous clock boundary, there are other control signals which need to be passed across this asynchronous clock boundary. One such control signal is a token signal which indicates to the packet transmitter whether or not there is storage capacity within an associated first-in-first-out buffer. This token can be used as part of a flow control system that provides "back pressure" between the packet transmitter and the packet receiver so as to gate the packet transmitter from sending more data packets when there is insufficient storage capacity within a receiving first-in-first-out buffer to store those data packets for resynchronisation across the asynchronous boundary. As the token itself must pass across the asynchronous clock boundary, it must also be provided with its own first-in-first-out buffer so it can be synchronised with its target clock domain.

Another feature of such systems exchanging data packets is that multiple channels may share the same packet transmission mechanism. Examples of such different channels would be a write address channel, a read address channel, a write data channel, a read data channel and a write response channel. Wide parallel signals on each of these channels may be broken down into a plurality of narrower data packets which are then time division multiplexed across the same data packet transmission circuits before being reassembled at the destination into their different respective channels. The packets from each of these channels will be consumed into their own first-in-first-out buffer for resynchronisation to the destination clock domain. Thus, the number of first-in-first-out buffers required increases and the resources consumed by those buffers similarly increases. This problem is further compounded when multiple virtual channels are supported. For example, multiple instances of the above mentioned five different channels may be supported with each of these instances corresponding to a respective virtual channel which may routed between a different pair of a source and a destination, but all crossing the same asynchronous clock boundary. The increase in the circuit resources required when multiple channels and multiple virtual channels are supported also applies to the control signals which pass the information back to the source of the data as to whether or not there is buffer storage capacity at the destination. These control signals (so called credits or tokens) which are passed back to the source also require their own buffers as previously mentioned. Separate tokens are needed for each of the different channels and each of the different virtual channels such that there is a rapid growth in the circuit resource required to pass these flow control signals between asynchronous clock domains.

One standard form of flow control signal is one using a token passing flow control mechanism. A token is associated with each unit of storage capacity within the destination buffer. As the source transmits a data packet to the destination, it decrements a count of the number of tokens available at the buffer. As the buffer empties a data packet it generates a token which is sent back to the source and used to increment the source token count. If the source token count indicates that no more storage capacity is available within the buffer, then no data packets are sent until a token is received indicating that storage capacity has become available within the buffer. More than one data packet may be emptied from the buffer in any time period and accordingly the system includes the capability to send signals indicating that multiple tokens should be applied to the source count at one time. The source side thus keeps a count of how much storage capacity is available at a destination buffer at a given time and accordingly does not overflow that buffer in a manner which may cause a data packet to be lost.

One superficially attractive possibility for decreasing the amount of circuit resource required to pass back the token count data to the source would be for the multiple channels to share a buffer for passing this token count data across the asynchronous clock boundary back to the source. However, a problem with this approach is that it introduces a dependency between the different channels in a manner which can degrade overall performance and, in some pathological cases, could lead to a deadlock. As an example, one of the channels may fill all of the buffer resources required for passing token data back to the source leaving the other channels unable to pass token data back to the source, thus stalling those other channels when in fact they do have buffer capacity able to receive new data packets. A further problem with this superficially attractive approach is that the buffer that is shared for the passing of token data back to the source should be sized for the combination of worst case situations that can arise across all of the channels which share that buffer. Thus, the saving in resource by sharing this buffer is reduced.

SUMMARY OF THE INVENTION

Viewed from one aspect the present invention provides an apparatus for processing data comprising:

a packet transmitter configured to generate data packets under control of a transmitter clock signal;

a packet receiver configured to receive data packets into a buffer circuit within said packet receiver under control of a receiver clock signal, said receiver clock signal being asynchronous from said transmitter clock signal; and communication circuitry coupled to said packet transmitter and to said packet receiver and configured to transfer data packets across an asynchronous clock boundary between a transmitter clock domain containing transmitter domain circuits operating in synchronism with said transmitter clock signal and including said packet transmitter and a receiver clock domain containing receiver domain circuits operating in synchronism with said receiver clock signal and including said packet receiver, wherein said communication circuitry includes:

a transmitter counter coupled to said packet transmitter, operating within said transmitter clock domain and configured to change a transmitter count value by a predetermined change value when said packet transmitter outputs a data packet to said communication circuit;

a receiver counter coupled to said packet receiver, operating outside said transmitter clock domain and configured to change a receiver count value by said predetermined change value when a data packet is removed from said buffer circuit; and comparison circuitry configured:
(i) to receive said transmitter count value from said transmitter counter;
(ii) to receive said receiver count value from said receiver counter;
(iii) to perform a comparison of said transmitter count value and said receiver count value; and
(iv) to generate a credit signal in dependence upon said comparison, said credit signal indicating whether or not said buffer circuit has any free space available for receiving a data packet; and wherein said packet transmitter is configured to gate transmitting of data packets to said packet receiver via said communication circuitry in dependence upon said credit signal.

The present technique provides flow control using a mechanism in which tokens are no longer passed across the asynchronous clock boundary consuming resource with their own buffer requirements, but instead each side of the asynchronous clock boundary keeps its own count value with the count value of the receiver being passed back to the transmitter. These count values are compared and from this comparison a determination made as to whether or not there is available storage capacity within the buffer at the packet receiver and accordingly the data packet flow may be gated so as not to overflow this buffer. The source side of the communication does not attempt to keep a count of the tokens consumed or recovered but instead compares the count values from both sides of the asynchronous clock boundary to determine that there is at least enough storage capacity within the buffer to receive a given data packet(s). It may be that there is more than sufficient storage capacity within the buffer to receive the data packet, but this information is redundant. It will be appreciated that the previous technique of passing tokens between the source and the destination resulted in redundant information being sent back to the source as it is not actually required to know exactly how much storage capacity is available within the buffer, but rather what is required is to determine that there is at least enough storage capacity available to receive the data packet to be sent. This relaxation of the requirements upon the information which must be sent back from the receiver side to the transmitter side has the effect that the resource associated with providing buffers to accurately capture all tokens being passed back from the receiver to the source may be avoided and instead a receiver counter value may be passed back and compared with the transmitter count value. Should synchronisation issues across the asynchronous clock boundary have the effect than an out-of-date receiver count value is present on the transmitter side, or that an intermediate receiver count value between a previous receiver count value and a current receiver count value is missed no damaging effect upon the operation of the system will arise since no strict count of tokens is being kept and providing whatever receiver count value is currently passed back to the transmitter side indicates that storage is available in the buffer at the receiver, then a safe transmission of a data packet may be made. If an out-of-date receiver count value is currently held on the transmitter side, then this will be safe as the effect will be to indicate that storage space within the buffer is not available and so a data packet will not be sent and there will be no data lost. Updated receiver count values indicating that space is available within the buffer at the receiver are delayed rather than being sent too soon to the transmitter side and accordingly there is a reduced risk of data loss due to a data packet being sent when no storage capacity is available within the buffer at the receiver.

While it is possible for the transmitter count value and the receiver count value to be managed in different ways, a simple and efficient way of implementing the present technique is when the transmitter count value and the receiver count value are changed in a common direction by a predetermined change value. The transmitter count value can thus, for example, be incremented whenever a data packet is sent. The receiver count value would in this case be incremented whenever a data packet was removed from the buffer. If the difference between the transmitter count value and the receiver count value as observed on the transmitter side exceeds a given threshold, then this indicates that the buffer is full and no more data packets should be sent at that time.

The present techniques are concerned with the passage of data across an asynchronous clock boundary. The transmitter clock domain and the receiver clock domain are asynchronous from each other. In some embodiments the communication circuit which is disposed between these two clock domains may itself comprise a further clock domain, e.g. a communication circuitry clock domain that is separate from the transmitter clock domain and the receiver clock domain. As the transmitter clock domain and the receiver clock domain are asynchronous with each other, then there will be at least one asynchronous clock boundary which needs to be crossed between the transmitter clock domain and the receiver clock domain irrespective of the presence of the communication circuit clock domain therebetween. The communication circuitry clock domain could be synchronous with the transmitter clock domain in which case there would be an asynchronous clock boundary between the communication clock circuitry domain and the receiver clock domain. Alternatively, it is possible that the communication circuit clock domain could be synchronous with the receiver clock domain and there is an asynchronous clock boundary between the transmitter clock domain and the communication circuit clock domain.

The separate provision of the communication circuit clock domain allows the communication clock signal within this communication circuit clock domain to be higher than the clock signals within the transmitter clock domain or the receiver clock domain (e.g. an integer multiple thereof) to allow the communication circuits operating within the communication circuit clock domain to achieve a data throughput sufficient to transfer the multiple data packets into which signals to be passed from the source side to the destination side are broken down, transmitted and reassembled.

One normal way in which the present technique may operate is that the comparison circuitry is disposed within the transmitter clock domain and the receiver count value is passed across the asynchronous clock boundary from the receiver clock domain to the transmitter clock domain. It is possible that in other embodiments the comparison circuitry might be disposed within the receiver clock domain with the transmitter count value being passed across the asynchronous boundary from the transmitter clock domain to the receiver clock domain. In this circumstance, the credit signal would need to be passed back across the asynchronous clock boundary to the transmitter clock domain in order to control the packet transmitter, but if the latency associated with this was acceptable, then such a solution would work.

In order to reduce metastability issues associated with passing the count values between domains in preferred embodiments the transmitter counter is a transmitter Gray counter and the receiver counter is a receiver Gray counter.

The predetermined change value that is applied to the transmitter counter and the receiver counter could have a variety of different forms. The change could be an increment or a decrement. The change could be by a value of one or a value of more than one. It is possible that data packets could have different sizes and this could be reflected in the predetermined change values applied. However, in one simple embodiment the predetermined change value is an increment of one for data packets of a fixed size.

Whilst the present techniques could be used in embodiments having only a single channel of communication, the technique is particularly useful when multiple channels of communication and/or multiple virtual channels are supported. In this circumstance a plurality of pairs of a packet transmitter and a packet receiver are provided with each pair having an associated transmitter count value and receiver count value that are compared to generate an associated credit signal used to gate transmitting of data packets from the packet transmitter to the packet receiver of that pair.

The present techniques are applicable to data packet transmission across an asynchronous clock boundary in general. The techniques could be used outside the field of integrated circuit interconnect signals. However, the present techniques are particularly well suited to embodiments in which the packet transmitter is coupled to an integrated circuit interconnect parallel interface and is configured to convert parallel signals received from that integrated circuit interconnect parallel interface to data packets for transmission via the communication circuit.

The communication circuit could transmit the data packets as an intra-IC communication within a single integrated circuit or alternatively, in some embodiments, as an inter-IC communication between different integrated circuits disposed within separate integrated circuit packages. Different integrated circuits may be connected via a printed circuit board.

Control of the change of the transmitter count value and the receiver count value may be performed in a variety of different ways. One convenient and secure way of controlling the application of the predetermined change value to these count values may be one in which a handshake signal received by the packet transmitter from the communication circuit when it accepts a data packet for transmission may serve to trigger the change to the transmitter count value.

In a similar way, a handshake signal received from an integrated circuit interconnect parallel interface when that interface accepts a data packet from the buffer circuit of the packet receiver may be used to trigger the predetermined change value to be applied to the receiver counter.

The buffer circuit within the packet receiver may have the form of a first-in-first-out buffer, but it is possible that other forms of buffer might be used, such as a reordering buffer depending upon the protocol of the data transmission employing the data packets.

While a full first-in-first-out buffer does not need to be provided to pass the count values across the asynchronous clock boundary due to the fail safe nature of the data being transferred, it may nevertheless be appropriate to robust operation if a synchronisation circuit is provided to synchronise the receiver count value to the transmitter clock signal when the receiver count value is passed from the receiver clock domain to the transmitter clock domain.

As previously mentioned, the changes applied to the transmitter count value and the receiver count value means some embodiments apply be a change in the same direction as data packets are sent and data packets are emptied from the buffer respectively. However, in other embodiments it is possible that the transmitter count value and the receiver count value are changed in opposite directions by the predetermined change value. In this case, the comparison circuitry may be configured to track changes in the two count values and use these to reconstruct an indication of the whether a sufficient amount of available storage space in the buffer circuit. It may be that the credit signal generate is based upon an out-of-date receiver count value, but this will be a safe error as it will indicate that insufficient space is available within the buffer circuit and accordingly data packets will not be sent and risk being lost. The count values transferred across the asynchronous clock boundary provide a fail-safe communication technique in which a count of tokens consumed on the transmitter side and then returned from the receiver side need not be maintained thereby easing the circuit requirements for transferring such tokens across the asynchronous clock boundaries.

Viewed from another aspect the present invention provides an apparatus for processing data comprising:

packet transmitter means for generating data packets under control of a transmitter clock signal;

packet receiver means for receiving data packets into buffer means for storing data packets within said packet receiver means under control of a receiver clock signal, said receiver clock signal being asynchronous from said transmitter clock signal; and communication means, coupled to said packet transmitter means and to said packet receiver means, for transferring data packets across an asynchronous clock boundary between a transmitter clock domain containing transmitter domain circuits operating in synchronism with said transmitter clock signal and including said packet transmitter means and a receiver clock domain containing receiver domain circuits operating in synchronism with said receiver clock signal and including said packet receiver means; wherein said communication means includes:

transmitter counter means, coupled to said packet transmitter means and operating within said transmitter clock domain, for changing a transmitter count value by a predetermined change value when said packet transmitter means outputs a data packet to said communication means;

receiver counter means, coupled to said packet receiver and operating outside said transmitter clock domain, for changing a receiver count value by said predetermined change value when a data packet is removed from said buffer means; and comparison means for:
(i) receiving said transmitter count value from said transmitter counter means;
(ii) receiving said receiver count value from said receiver counter means;
(iii) comparing said transmitter count value and said receiver count value; and
(iv) generating a credit signal in dependence upon a result of said comparing, said credit signal indicating whether or not said buffer means has any free space available for receiving a data packet; and wherein said packet transmitter means is configured to gate transmitting of data packets to said packet receiver means via said communication means in dependence upon said credit signal.

Viewed from a further aspect the present invention provides a method of processing data comprising the steps of:

generating data packets with a data transmitter under control of a transmitter clock signal;

receiving data packets within a data receiver into a buffer circuit within said packet receiver under control of a receiver clock signal, said receiver clock signal being asynchronous from said transmitter clock signal; and transferring data packets across an asynchronous clock boundary between a transmitter clock domain containing transmitter domain circuits operating in synchronism with said transmitter clock signal and including said packet transmitter and a receiver clock domain containing receiver domain circuits operating in synchronism with said receiver clock signal and including said packet receiver;

changing a transmitter count value of a transmitter counter operating within said transmitter clock domain by a predetermined change value when said packet transmitter outputs a data packet;

changing a receiver count value of a receiver counter operating outside said transmitter clock domain by said predetermined change value when a data packet is removed from said buffer circuit;

comparing said transmitter count value and said receiver count value;

generating a credit signal in dependence upon a result of said comparing, said credit signal indicating whether or not said buffer means has any free space available for receiving a data packet; and gating transmission of data packets to said packet receiver in dependence upon said credit signal.

The above, and other objects, features and advantages of this invention will be apparent from the following detailed description of illustrative embodiments which is to be read in connection with the accompanying drawings.

DESCRIPTION OF THE EMBODIMENTS

Figure 1:
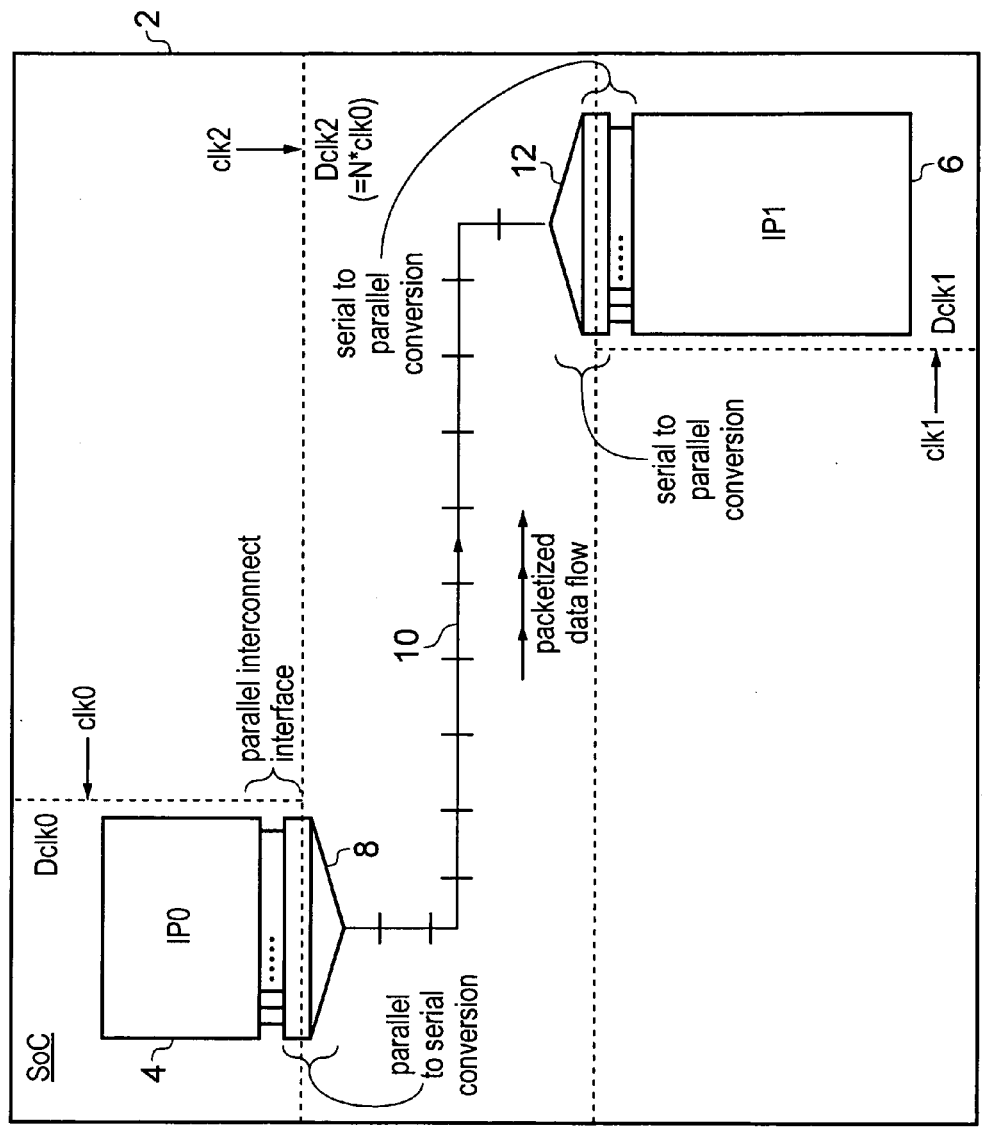
FIG. 1 schematically illustrates a system-on-chip integrated circuit in which parallel interconnect signals are converted to data packets for transmission across an asynchronous clock boundary and then converted back into parallel interconnect signals.

FIG. 1 schematically illustrates a system-on-chip integrated circuit 2 including a source functional block 4 and a destination functional block 6 between which it is desired to pass signals. The source functional block 4 and the destination functional block 6 can take a variety of different forms, e.g. a processor core, a graphics processing unit, a memory controller, an input/output controller, a memory controller etc. Such functional blocks 4, 6 are conventionally provided with a parallel interconnect interface, such as an AXI interface as designed by ARM Limited of Cambridge, England. Such a parallel interconnect interface is wide and may include several hundred bit line signals. In order to efficiently transfer the signals from this wide parallel interconnect interface across the system-on-chip integrated circuit, the present technique uses parallel-to-serial conversation which converts the parallel interconnect interface signals into a plurality of data packets. This conversion and packet transmission circuitry generates data packets which are time-division-multiplexed across communication circuitry 10 and then received at packet receiver circuitry 12. The packet receiver circuitry 12 reassembles the parallel interconnect interface signals through a serial-to-parallel conversion. It will be appreciated that the data packets sent across the communication circuit 10 may themselves be a plurality of bits wide. As an example, the data packets may be 8-bit parallel signals routed through eight parallel bit lines. Multiple such data packets are transmitted in series to represent what may be hundreds of bit line signals which comprise the full interconnect parallel interface (e.g. AXI interface).

Figure 2:
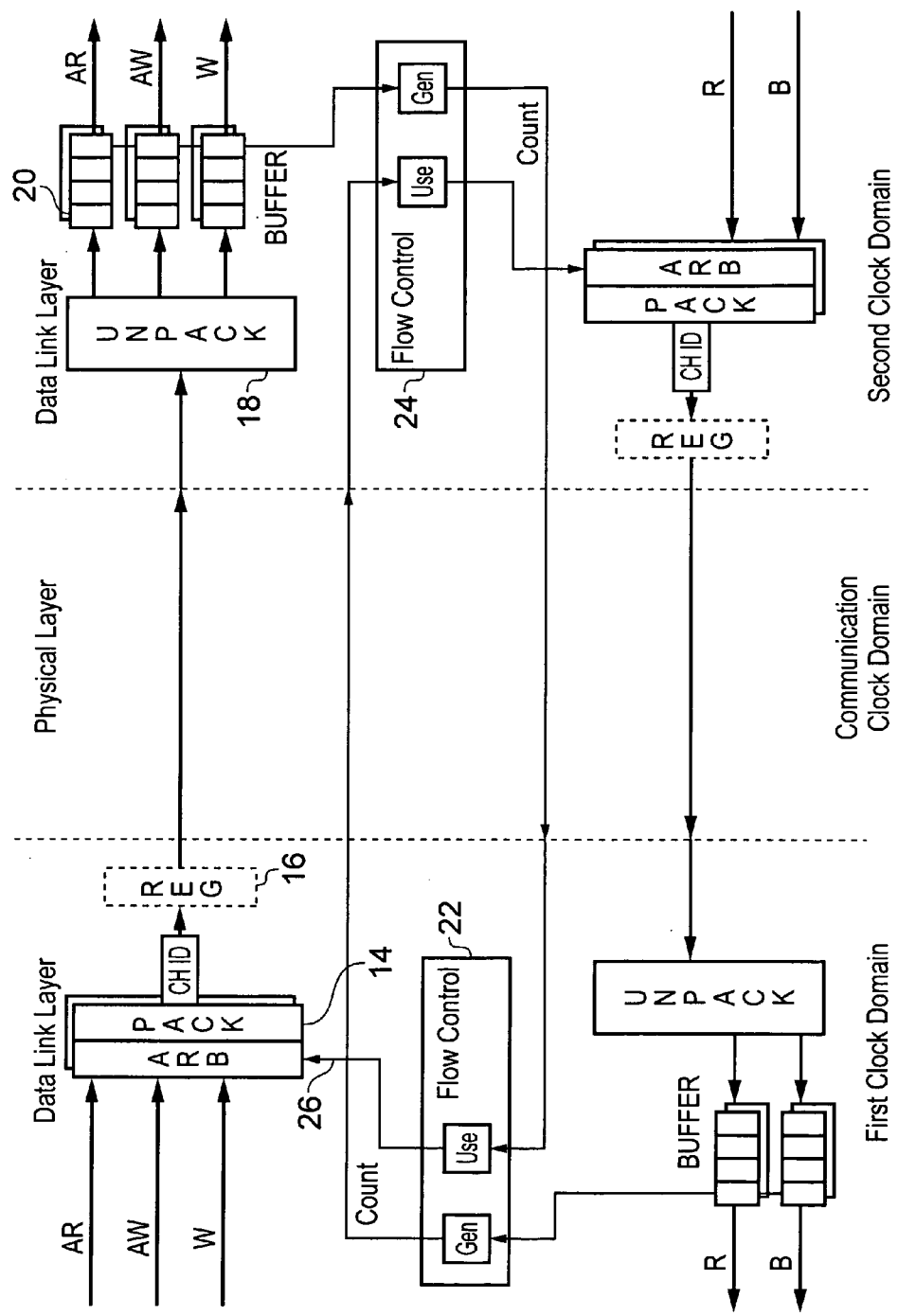
FIG. 2 schematically illustrates such a parallel-to-serial data packet communication technique for passing multiple channels between a source and a destination within an integrated circuit.

Also illustrated in FIG. 2 are multiple clock domains Dclk0, Dclk1 and Dclk2 which may be present within a system-on-chip integrated circuit 2. The clock domain Dclk0 containing the data packet source 4, 8 is asynchronous with the clock domain Dclk1 containing the data packet destination 12, 6. A further clock domain Dclk2 containing the Communication circuit 10 may operate at its own clock frequency, typically an integer multiple of the source clock frequency. There is an asynchronous clock boundary somewhere between the packet source 4, 8 and the packet destination 12, 6.

It will be appreciated that FIG. 1 illustrates only one source and one destination and the transfer of data packets in a single direction. It will be appreciated by those in this technical field that such a system-on-chip integrated circuit 2 will typically comprise multiple data sources and multiple data destinations together with communication circuits 10 which pass data packets in different directions and which may be permit a variety of different connections between the functional blocks 4, 6. FIG. 1 has been simplified over this real-life situation for the sake of clarity.

FIG. 2 schematically illustrates data flow between a first clock domain and a second clock domain via a communication clock domain using a packetisation technique. Within the first clock domain, multiple data channels AR, AW and W need to be sent from the first clock domain to the second clock domain. In the reverse direction, multiple data channels R and B need to be returned in the opposite direction to the second clock domain from the first clock domain. Furthermore, as illustrated, there are multiple virtual channels layered over each of these physical channels. Thus, for example, the read address channel AR may be provided in multiple virtual channels each having an associated pair of a packet transmitter and a packet receiver within the first clock domain and the second clock domain.

Taking as an example the read address channel AR, packing circuitry 14 and a register 16 may form part of the packet transmitter. The wide parallel read address is broken down into a plurality of narrower data packets, with an associated channel identifier (CHID) applied thereto, that are assembled within a register 16 before being passed across the communication clock domain and received in unpacking circuitry 18 within the second clock domain. This unpacking circuitry 18 serves to reassemble the wide read address signal and place this into an associated first-in-first-out buffer circuit 20. The unpacking circuitry 18 and the buffer circuit 20 form part of the packet receiver within the second clock domain. The packing circuitry 14 and the unpacking circuitry 18 may be shared between the different channels AR, AW and W. On the receiver side each of these separate channels and each of the virtual channels is provided with its own buffer circuit 20 into which the parallel signals may be reassembled and resynchronised back to the receiver clock domain.

In the reverse direction from the second clock domain to the first clock domain, similar packing, channel identification, register and unpacking circuits are provided together with associated buffer circuits into which the parallel interconnect signals are reassembled.

Schematically illustrated in FIG. 2 is flow control circuitry 22, 24 provided to control flow in either direction. The flow control circuitry 22 serves to gate packet data flow between the first clock domain and the second clock domain dependent upon the availability of storage space within the respective buffer circuits 20 within the second clock domain. In order to do this, the flow control circuitry 22 generates a credit signal 26. The flow control circuitry 22 is part of the communication circuitry and includes a transmitter counter which records a count value of data packets sent via the communication link on a per channel basis. Receiver count values on a per channel basis noting data packets emptied from respective buffer circuits 22 are returned from the flow control circuitry 24 within the second clock domain to the flow control circuitry 22 within the first clock domain. The receiver count value and the transmitter count value are compared by comparison circuitry within the flow control circuitry 22 to determine whether or not storage capacity is available within the associated buffer circuit 20 to receive a further data packet. This determination is used to generate the credit signal which gates whether or not that further data packet is sent.

Similar count values are transferred and compared in the opposite direction in respect of data packets being sent from the second clock domain to the first clock domain. Thus, the present technique is symmetric.

Figure 3:
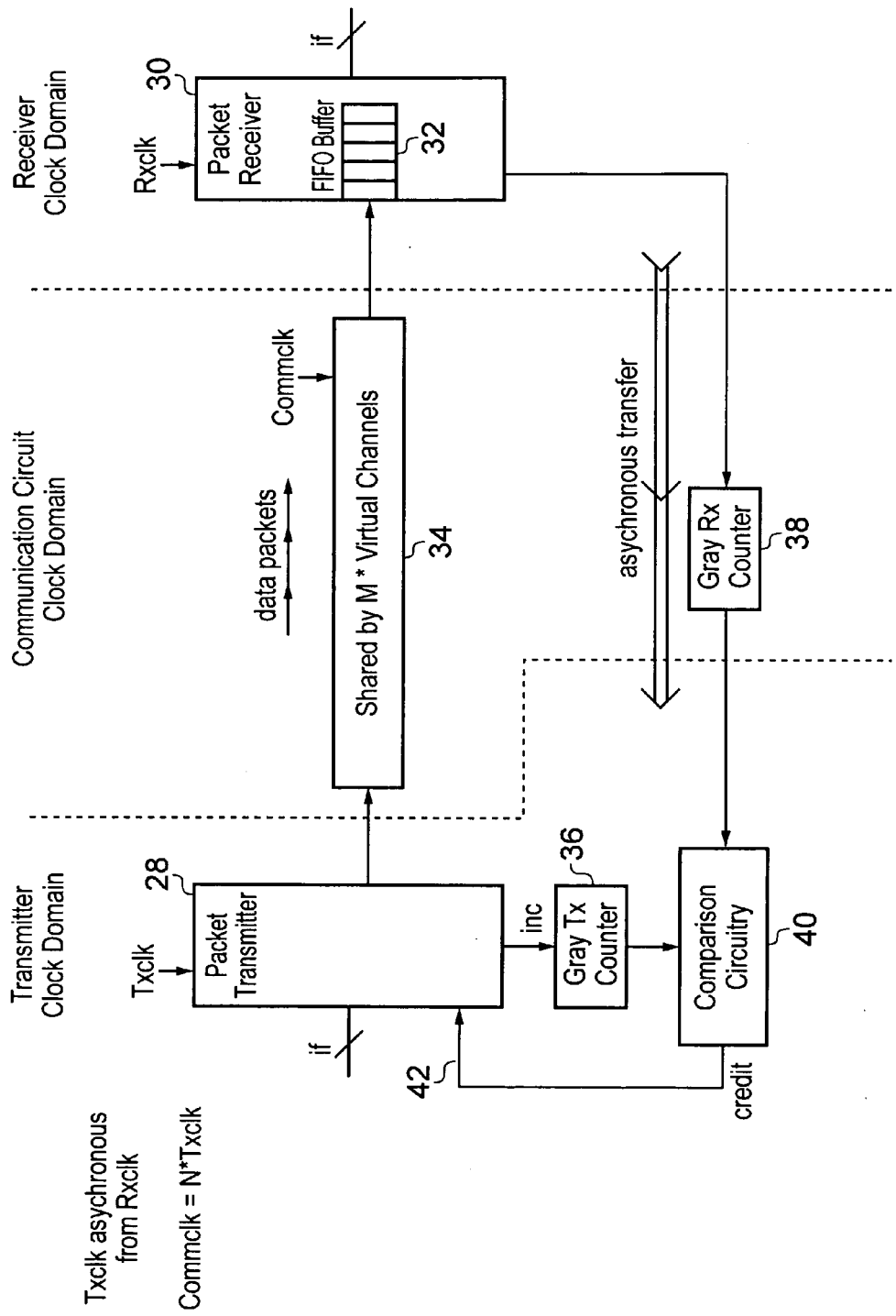
FIG. 3 schematically illustrates such data packet communication with the transfer of a receiver count value from the receiver clock domain back to the transmitter clock domain in order to be compared with a transmitter count value and generate a credit signal for controlling packet flow.

FIG. 3 illustrates the flow control mechanism in more detail in respect of a single data channel. A packet transmitter 28 serves to generate data packets under control of a transmitter clock within a transmitter clock domain. A packet receiver 30 serves to receive data packets into a first-in-first-out buffer circuit 32 under control of a receiver clock signal within a receiver clock domain. Communication circuitry including a data packet transmission circuit 34 operates within a communication circuit clock domain to transfer data packets from the packet transmitter 28 to the packet receiver 30 when storage capacity is available within the buffer circuit 32. The communication circuit clock domain operates under control of a communication circuit clock synchronous with and having a frequency that is an integer multiple of the transmitter clock. The communication circuitry further includes a transmitter counter 36 coupled to the packet transmitter 28 and operating within the transmitter clock domain. The transmitter counter 36 changes its count value by a predetermined change value (e.g. an increment of one) when the packet transmitter 26 outputs a data packet to the communication circuit. The communication circuit further includes a receiver counter 38 which operates outside of the transmitter clock domain (in this case within the communication circuit clock domain) and serves to change its receiver count value by the predetermined change value when a data packet is removed from the associated buffer circuit 32. The transmitter counter 36 and the receiver counter 38 are both Gray counters in which the predetermined change value applied is an increment of one.

Also provided within the communication circuitry is comparison circuitry 40 which serves to receive the transmitter count value and the receiver counter value and to generate a credit signal 42. The credit signal 42 is applied to the packet transmitter 38 and serves to gate whether or not the packet transmitter sends a data packet in dependence upon whether or not the comparison of the count value indicates that storage space is available within the buffer circuit 32.

It will be appreciated that different portions of the communication circuit operate within different clock domains. The portion of the communication circuit 34 which transfers the data packets operates within the communication circuit clock domain. The receiver counter 38 similarly operates, in this example, within the communication circuit clock domain. The comparison circuitry 40 and the transmitter counter 36 operate within the transmitter clock domain in this example embodiment. In this example embodiment, the communication circuit clock is synchronous with an integer multiple of the transmitter clock. The transmitter clock is asynchronous with the receiver clock. Accordingly, there is an asynchronous clock boundary between the receiver clock domain and the communication circuit clock domain.

Figure 4:
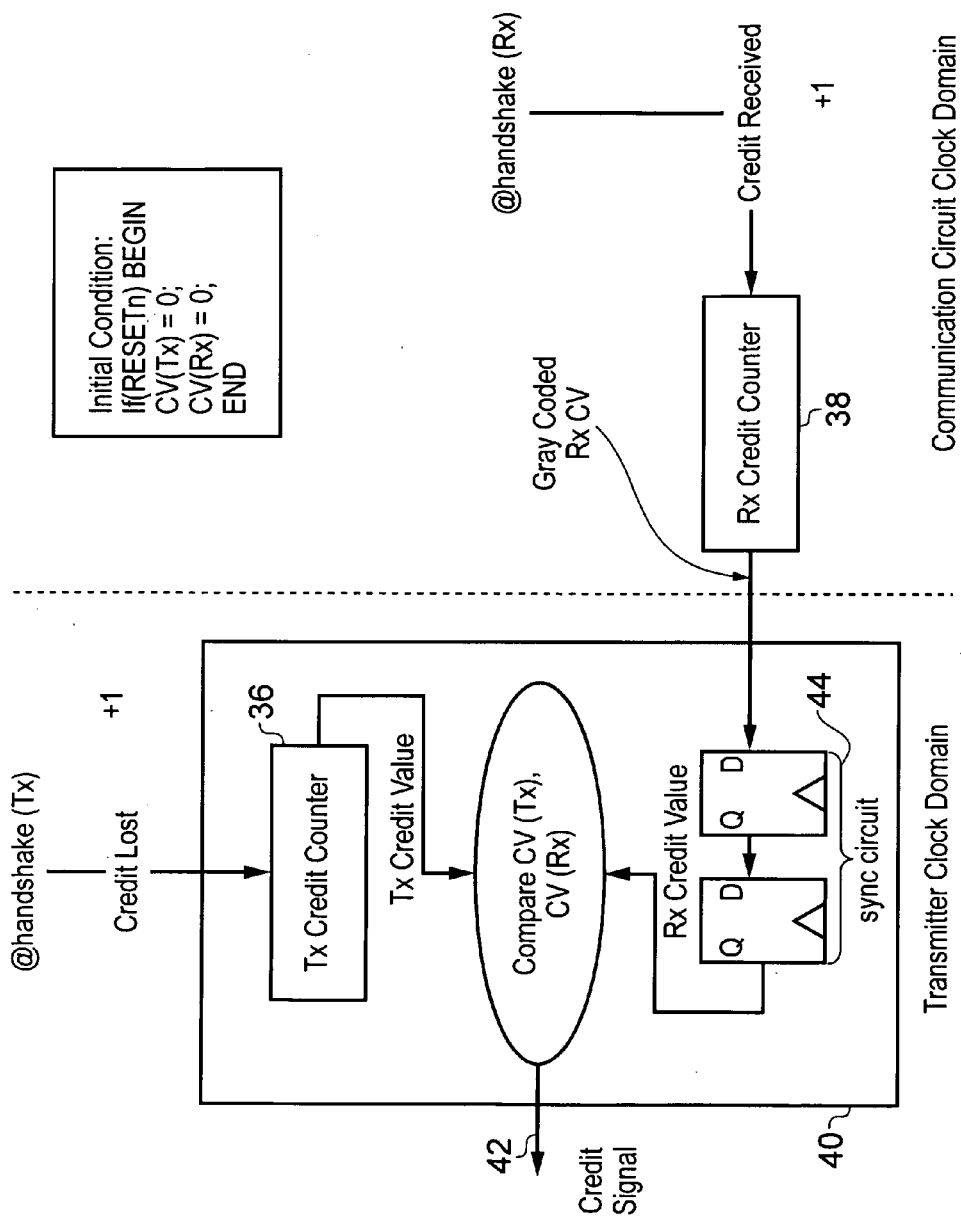
FIG. 4 schematically illustrates the passing back of the receiver count value and the generation of the credit signal.

FIG. 4 schematically illustrates the comparison circuitry 40 in more detail. The initialisation conditions for the transmitter count value and the receiver count value are that each of these is set to zero when the integrated circuit 2 is reset. A synchronisation circuit 44 within the comparison circuit 40 serves to synchronise the receiver count value from the communication circuit clock domain to the transmitter clock domain. The transmitter counter increments whenever it receives a handshake signal from the packet transmitter 28 indicating that a data packet has been sent via the communication circuit to the packet receiver 30. The receiver counter 38 is incremented whenever it receives a handshake signal indicating that a data packet has been removed from its associated buffer circuit 32. The comparison performed by the comparison circuitry 40 is to determine whether or not the difference between the transmitter count value and the receiver count value exceeds a predetermined threshold indicating that the buffer circuit 32 is full. If this threshold is exceeded, then the credit signal serves to inhibit further data packet transmission by the packet transmitter 28. If this threshold is not exceeded, then such further packet transmission is permitted.

Figure 5:
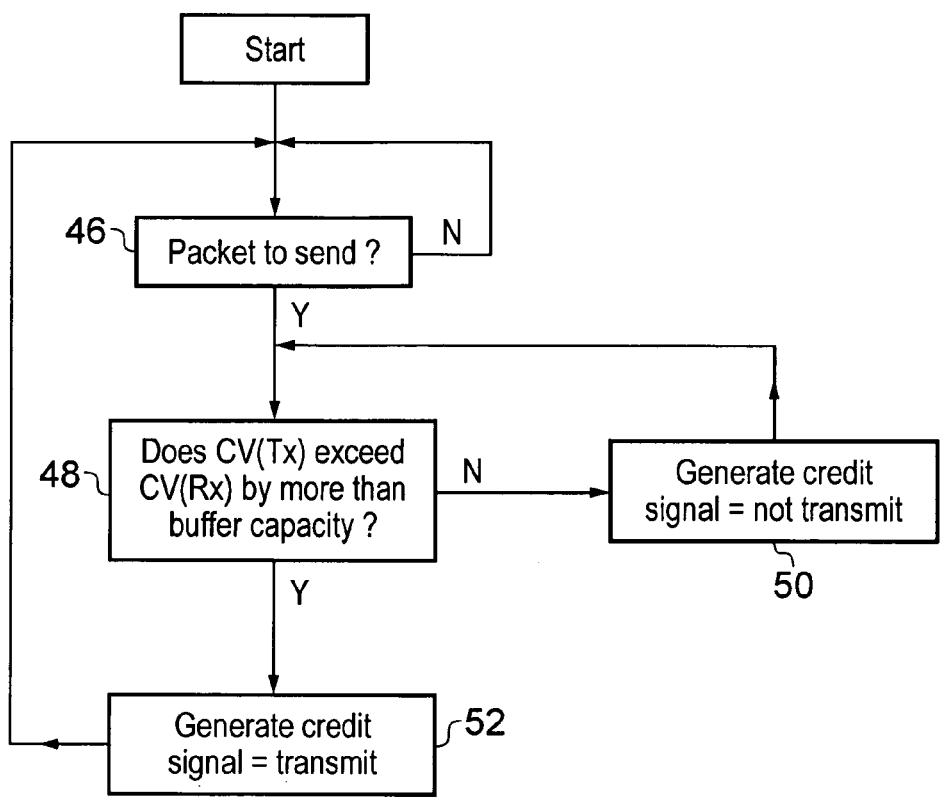
FIG. 5 is a flow diagram schematically illustrating the use of the count values in generating a credit signal to gate packet transmission.

FIG. 5 schematically illustrates the action of the comparison circuitry 40. At step 46 a determination is made as to whether or not there is a data packet waiting to be sent. At step 48 a determination is made as to whether or not the difference between the transmitter count value and the receiver count value exceeds a threshold value indicating that there is no free space within the buffer circuit 32. If there is no free space, then step 50 generates a credit signal indicating that no transmission is to take place. If the comparison indicates that there is free space, then step 52 generates a credit signal indicating that transmission is permitted.

Figure 6:
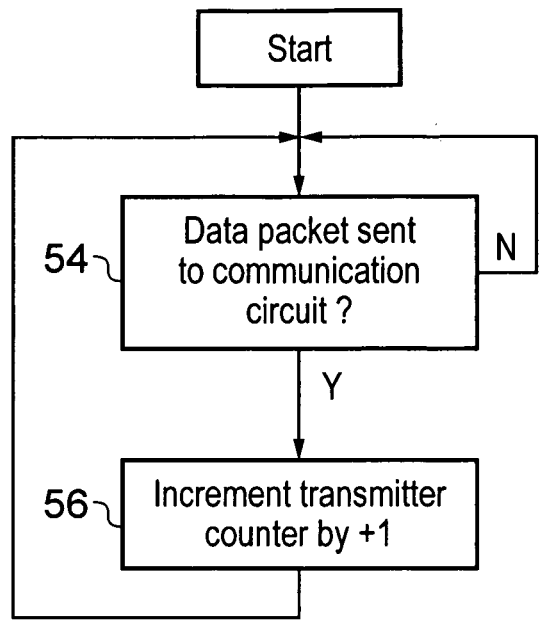
FIG. 6 is a flow diagram schematically illustrating the update of the transmitter count value.

FIG. 6 is a flow diagram illustrating the control of the transmitter count value. At step 54 a determination is made as to whether or not a data packet has been sent to the communication circuit. When a data packet has been sent to the communication circuit, then step 56 serves to increment the transmitter count value by one.

Figure 7:
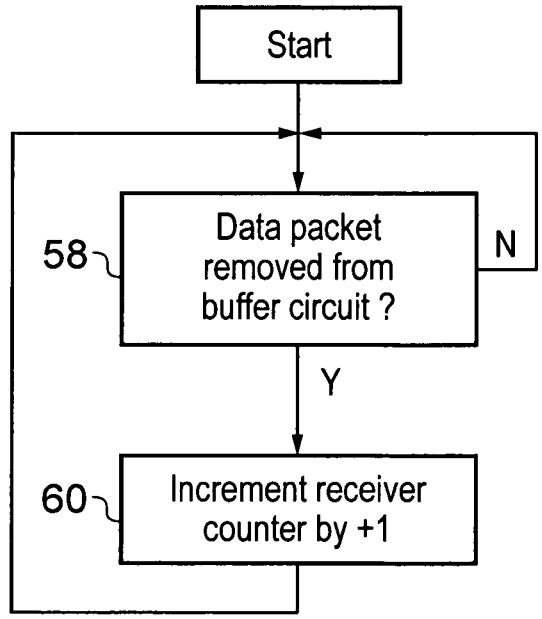
FIG. 7 is a flow diagram schematically illustrating the update of the receiver count value.

FIG. 7 is a flow diagram schematically illustrating control of the receiver count value. At step 58 a determination is made as to whether or not a data packet has been removed from the buffer circuit 32. When a data packet has been removed from the buffer circuit 32, then step 60 serves to increment the receiver count value by one.

Figure 8:
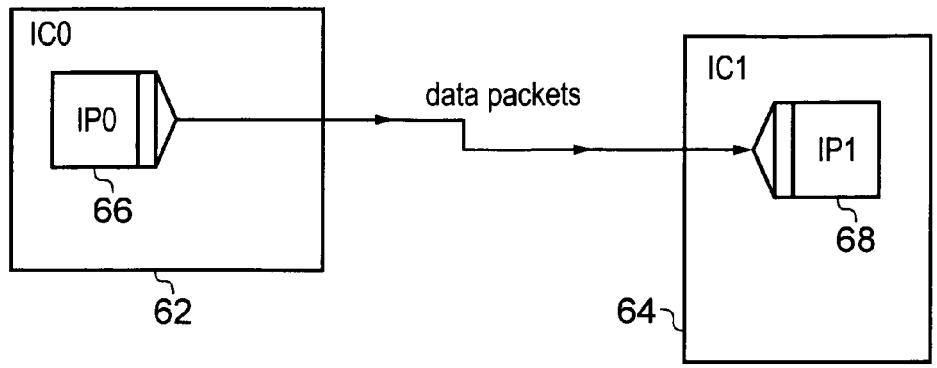
FIG. 8 is a diagram schematically illustrating the use of the present technique in inter-IC communication between first and second integrated circuit packages.

FIG. 8 is a diagram schematically illustrating the use of the present technique between two separate integrated circuits 62, 64 to provide inter-IC communication via data packets. The functional circuits 66, 68 within respective integrated circuits 62, 64 generate wide parallel interconnect interface signals. These wide parallel signals are converted into data packets which are serially transmitted across a communication channel before being reassembled into wide parallel signals at the reception side. FIG. 8 illustrates data packet transfer in one direction, but it will be appreciated that data transfer in the opposite direction can take place as well as multiple channels of data transferred in each direction overlaid with potentially multiple virtual channels. The present technique is applicable to such embodiments.

Figure 9:
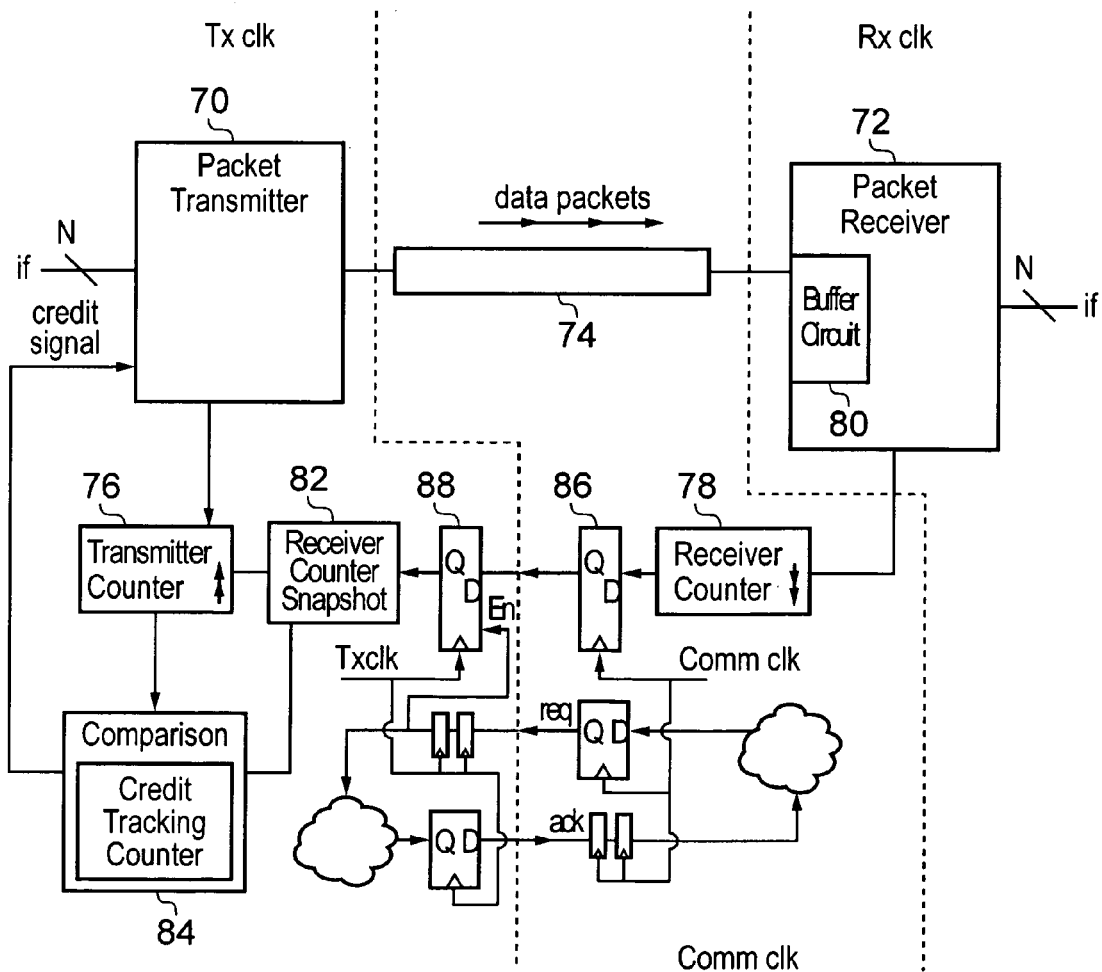
FIG. 9 schematically illustrates a further example embodiment in which the transmitter count value and the receiver count value are changed in opposite directions and are used to reconstruct a capacity indication for use in generating a credit signal for gating packet transmission.

FIG. 9 illustrates an alternative embodiment. A packet transmitter 70 is used to send data packets to a packet receiver 72. The communication circuit includes a circuit 74 for transmitting the data packets in a time-division-multiplexed fashion through a communication circuit clock domain interposed between the transmitter clock domain and the receiver clock domain. The transmitter counter 76 keeps a transmission count value which is incremented whenever a data packet is sent by the packet transmitter 70. A receiver counter 78 keeps a receiver count value which is decremented whenever a data packet is removed from a buffer circuit 80 within the packet receiver 72. The receiver count value is passed back to the transmitter clock domain where it is stored within a receiver counter snapshop circuit 82. The receiver count value from the receiver counter snapshot circuit 82 is supplied to comparison circuitry 84 together with the transmitter count value. The comparison circuit 84 uses the received transmitter count value and the received receiver count value to track changes in these two respective values that together indicate whether or not storage space is available within the buffer circuit 80 to receive a further data packet. Thus, the credit signal for gating further data packet transmission be generated based upon the tracking of changes in the transmitter count value and the receiver counter value.

The passing of the receiver count value across the asynchronous clock boundary (in this example between the communication signal clock domain and the transmitter clock domain) may be achieved using registers 86, 88 acting under control of request and acknowledge signals that are themselves synchronised across the asynchronous clock boundary. Such techniques for passing simple signals across an asynchronous clock boundary will be familiar to those in this technical field. As a simple receiver counter value is passed across the asynchronous clock boundary and there is no strict requirement for every change in this receiver clock value to be separately indicated to the transmitter side, the circuit overhead associated with providing credit/token based flow control may be reduced whilst fail safe operation may be maintained.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. Apparatus for processing data comprising:
a packet transmitter configured to generate data packets under control of a transmitter clock signal;
a packet receiver configured to receive data packets into a buffer circuit within said packet receiver under control of a receiver clock signal, said receiver clock signal being asynchronous from said transmitter clock signal; and
communication circuitry coupled to said packet transmitter and to said packet receiver and configured to transfer data packets across an asynchronous clock boundary between a transmitter clock domain containing transmitter domain circuits operating in synchronism with said transmitter clock signal and including said packet transmitter and a receiver clock domain containing receiver domain circuits operating in synchronism with said receiver clock signal and including said packet receiver; wherein said communication circuitry includes:

a transmitter counter coupled to said packet transmitter, operating within said transmitter clock domain and configured to change a transmitter count value by a predetermined change value when said packet transmitter outputs a data packet to said communication circuit;

a receiver counter coupled to said packet receiver, operating outside said transmitter clock domain and configured to change a receiver count value by said predetermined change value when a data packet is removed from said buffer circuit; and comparison circuitry configured:

(i) to receive said transmitter count value from said transmitter counter;

(ii) to receive said receiver count value from said receiver counter;

(iii) to perform a comparison of said transmitter count value and said receiver count value; and (iv) to generate a credit signal in dependence upon said comparison, said credit signal indicating whether or not said buffer circuit has any free space available for receiving a data packet; and wherein said packet transmitter is configured to gate transmitting of data packets to said packet receiver via said communication circuitry in dependence upon said credit signal.

2. Apparatus as claimed in claim 1, wherein said transmitter count value and said receiver count value are changed in a common direction by said predetermined change value.

3. Apparatus as claimed in claim 1, wherein at least some portions of said communication circuit operates within a communication circuit clock domain separate from said transmitter clock domain and said receiver clock domain to transfer said data packets under control of a communication clock signal and said communication clock signal is an integer multiple of and synchronous with one of said transmitter clock signal and said receiver clock signal.

4. Apparatus as claimed in claim 1, wherein said comparison circuitry is disposed within said transmitter clock domain and said receiver count value is passed across said asynchronous clock boundary from said receiver clock domain to said transmitter clock domain.

5. Apparatus as claimed in claim 1, wherein:

said transmitter counter is a transmitter Gray counter and said transmitter count value is a Gray coded transmitter count value; and said receiver counter is a receiver Gray counter and said receiver count value is a Gray coded receiver count value.

6. Apparatus as claimed in claim 1, wherein said predetermined change value is an increment of one.

7. Apparatus as claimed in claim 1, comprising a plurality of pairs of a packet transmitter and a packet receiver each pair having an associated transmitter count value and receiver count value that are compared to generate an associated credit signal used to gate transmitting of data packets from said packet transmitter to said packet receiver of said pair.

8. Apparatus as claimed in claim 7, wherein a plurality of virtual channels of communication share said communication circuit, each of said plurality of virtual channels having at least one of said plurality of pairs configured to communicate data packets for that virtual channel.

9. Apparatus as claimed in claim 8, wherein said plurality of virtual channels are time division multiplexed via said communication circuit.

10. Apparatus as claimed in claim 1, wherein said packet transmitter is coupled to an integrated circuit interconnect parallel interface and is configured to convert parallel signals received from said integrated circuit interconnect parallel interface to data packets for transmission via said communication circuit.

11. Apparatus as claimed in claim 1, wherein said packet receiver is coupled to an integrated circuit interconnect parallel interface and is configured to convert data packets received from said communication circuit to parallel signals for transmission to said integrated circuit interconnect parallel interface.

12. Apparatus as claimed in claim 1, wherein said packet transmitter receives a transmitter handshake signal from said communication circuit when said communication circuit accepts a data packet for transmission to said packet receiver and said transmitter counter is configured to be triggered to change by said predetermined change value upon receipt of said transmitter handshake signal.

13. Apparatus as claimed in claim 11, wherein said packet receiver receives a receiver handshake signal from said integrated circuit interconnect parallel interface when said integrated circuit interconnect parallel interface accepts a data packet from said buffer circuit and said receiver counter is configured to be triggered to change by said predetermined change value upon receipt of said receiver handshake signal.

14. Apparatus as claimed in claim 1, wherein said packet transmitter and said packet receiver are disposed within a common integrated circuit.

15. Apparatus as claimed in claim 1, wherein said buffer circuit is a first-in-first-out buffer circuit.

16. Apparatus as claimed in claim 4, wherein a synchronisation circuit synchronises said receiver count value to said transmitter clock signal.

17. Apparatus as claimed in claim 2, wherein said comparison circuit is configured to generate said credit signal such that said credit signal will prevent said packet transmitter from sending a data packet to said packet receiver via said communication circuit if said transmitter count value differs from said receiver count value by greater that a predetermined amount corresponding to a maximum storage capacity of said buffer circuit.

18. Apparatus as claimed in claim 1, wherein said transmitter count value and said receiver count value are changed in opposite directions by said predetermined change value and said comparison circuitry is configured to track changes in said transmitter count value and said receiver count value that indicate an amount of available storage space in said buffer circuit and to generate said credit signal such that said credit signal will prevent said packet transmitter from sending a data packet to said packet receiver via said communication circuit if said buffer circuit does not have sufficient free space to store said data packet.

19. Apparatus for processing data comprising:

packet transmitter means for generating data packets under control of a transmitter clock signal;

packet receiver means for receiving data packets into buffer means for storing data packets within said packet receiver means under control of a receiver clock signal, said receiver clock signal being asynchronous from said transmitter clock signal; and communication means, coupled to said packet transmitter means and to said packet receiver means, for transferring data packets across an asynchronous clock boundary between a transmitter clock domain containing transmitter domain circuits operating in synchronism with said transmitter clock signal and including said packet transmitter means and a receiver clock domain containing receiver domain circuits operating in synchronism with said receiver clock signal and including said packet receiver means; wherein said communication means includes:

transmitter counter means, coupled to said packet transmitter means and operating within said transmitter clock domain, for changing a transmitter count value by a predetermined change value when said packet transmitter means outputs a data packet to said communication means;

receiver counter means, coupled to said packet receiver and operating outside said transmitter clock domain, for changing a receiver count value by said predetermined change value when a data packet is removed from said buffer means; and comparison means for:
(i) receiving said transmitter count value from said transmitter counter means;
(ii) receiving said receiver count value from said receiver counter means;
(iii) comparing said transmitter count value and said receiver count value; and
(iv) generating a credit signal in dependence upon a result of said comparing, said credit signal indicating whether or not said buffer means has any free space available for receiving a data packet; and wherein said packet transmitter means is configured to gate transmitting of data packets to said packet receiver means via said communication means in dependence upon said credit signal.

20. A method of processing data comprising the steps of:

generating data packets with a data transmitter under control of a transmitter clock signal;

receiving data packets within a data receiver into a buffer circuit within said packet receiver under control of a receiver clock signal, said receiver clock signal being asynchronous from said transmitter clock signal; and transferring data packets across an asynchronous clock boundary between a transmitter clock domain containing transmitter domain circuits operating in synchronism with said transmitter clock signal and including said packet transmitter and a receiver clock domain containing receiver domain circuits operating in synchronism with said receiver clock signal and including said packet receiver;

changing a transmitter count value of a transmitter counter operating within said transmitter clock domain by a predetermined change value when said packet transmitter outputs a data packet;

changing a receiver count value of a receiver counter operating outside said transmitter clock domain by said predetermined change value when a data packet is removed from said buffer circuit;

comparing said transmitter count value and said receiver count value;

generating a credit signal in dependence upon a result of said comparing, said credit signal indicating whether or not said buffer means has any free space available for receiving a data packet; and gating transmission of data packets to said packet receiver in dependence upon said credit signal.

* * * * *